United States Patent
Ng et al.

(10) Patent No.: US 9,492,914 B2
(45) Date of Patent: Nov. 15, 2016

(54) OPTICAL INTERFACE INSERTION AND EXTRACTION TOOL

(71) Applicant: Ciena Corporation, Hanover, MD (US)

(72) Inventors: Yim Kwong Ng, Ottawa (CA); Simon John Shearman, Almonte (CA)

(73) Assignee: Ciena Corporation, Hanover, MD (US)

( * ) Notice: Subject to any disclaimer, the term of this patent is extended or adjusted under 35 U.S.C. 154(b) by 597 days.

(21) Appl. No.: 13/887,820

(22) Filed: May 6, 2013

(65) Prior Publication Data

US 2014/0325816 A1    Nov. 6, 2014

(51) Int. Cl.
| | |
|---|---|
| *B25B 5/14* | (2006.01) |
| *B25B 27/14* | (2006.01) |
| *B25B 9/02* | (2006.01) |
| *B23P 19/00* | (2006.01) |
| *G02B 6/38* | (2006.01) |

(52) U.S. Cl.
CPC .............. *B25B 27/14* (2013.01); *B25B 9/02* (2013.01); *B23P 19/00* (2013.01); *B25B 5/14* (2013.01); *G02B 6/3897* (2013.01); *Y10T 29/49826* (2015.01)

(58) Field of Classification Search
CPC ........... B25B 5/14; G02B 6/3897; B23P 19/00
USPC ............. 29/825, 271, 764, 426.5; 81/487; 385/147, 134–139; 439/352, 480, 483, 439/152; 7/107
See application file for complete search history.

(56) References Cited

U.S. PATENT DOCUMENTS

| | | | | |
|---|---|---|---|---|
| 2,498,324 | A * | 2/1950 | Yourglich | ................. B25B 9/00 81/125 |
| 4,083,101 | A * | 4/1978 | Coller | .................... H01R 43/22 29/278 |
| 4,852,925 | A * | 8/1989 | Lodin | ...................... H01K 3/32 29/758 |
| 5,031,981 | A * | 7/1991 | Peterson | .............. G02B 6/3887 385/56 |

(Continued)

OTHER PUBLICATIONS

Nordent Surgical Handles (http://nordent.com/surgical/index.html) https://web.archive.org/web/20111119201628/http://www.nordent.com/art/pdf/surgical/Handles.pdf.*

(Continued)

*Primary Examiner* — Monica Carter
*Assistant Examiner* — Madhi H Nejad
(74) *Attorney, Agent, or Firm* — Clements Bernard PLLC; Christopher L. Bernard; Lawrence A. Barrata, Jr.

(57) ABSTRACT

A tool for insertion and extraction of optical fibers includes an elongated handle, a generally C-shaped cradle element at a first end of the elongated handle, a generally L-shaped hook element at a second end of the elongated handle having a long section connected to the elongated handle parallel to a longitudinal axis of the elongated handle and a short section perpendicular to the longitudinal axis of the elongated handle, and a generally U-shaped notch formed in the second end of the elongated handle. The tool is configured to facilitate the remote insertion and removal of an optical cable into an optical port of a device, such as a networking or telecommunications device. Various embodiments allow for the remote disengagement and removal of an SFP module from a device, such as a networking or telecommunications device.

15 Claims, 10 Drawing Sheets

(56) References Cited

U.S. PATENT DOCUMENTS

| | | | | |
|---|---|---|---|---|
| 5,090,663 | A * | 2/1992 | Crutchfield | B25C 11/00 254/28 |
| 5,146,813 | A * | 9/1992 | Stanfill, Jr. | B25B 9/00 81/111 |
| 5,226,230 | A * | 7/1993 | Klinger | B25B 27/10 285/308 |
| 5,413,575 | A * | 5/1995 | Haenggi | A61B 18/1402 606/39 |
| 5,554,155 | A * | 9/1996 | Awh | A61F 9/00736 604/20 |
| 5,956,832 | A * | 9/1999 | Reagan | B25B 27/14 29/278 |
| 6,692,306 | B1 * | 2/2004 | Chung | H01R 13/6335 174/74 R |
| 6,732,426 | B2 * | 5/2004 | Adams | B25B 27/10 29/729 |
| 6,733,323 | B2 * | 5/2004 | Tso-Chin | H01R 13/6335 439/484 |
| 6,817,272 | B2 * | 11/2004 | Holland | H01R 43/26 439/304 |
| 7,020,376 | B1 * | 3/2006 | Dang | B25B 9/02 385/135 |
| 7,080,581 | B2 * | 7/2006 | Reese | B25B 13/06 81/124.2 |
| 7,181,999 | B1 * | 2/2007 | Skeels | H01R 43/26 81/124.2 |
| 7,194,178 | B2 * | 3/2007 | Nakano | G02B 6/3898 385/134 |
| D541,610 | S * | 5/2007 | Segroves | D8/51 |
| 7,297,013 | B2 * | 11/2007 | Caveney | H01R 43/26 439/352 |
| 7,303,220 | B2 * | 12/2007 | Zellak | G02B 6/3807 29/762 |
| 7,534,128 | B2 * | 5/2009 | Caveney | H01R 43/26 29/764 |
| 7,814,634 | B2 * | 10/2010 | Francis | H01R 43/26 29/426.5 |
| 7,975,578 | B2 * | 7/2011 | Youtsey | B25B 13/06 81/124.2 |
| 8,056,219 | B2 * | 11/2011 | Wojcik | H01R 13/506 29/739 |
| 8,295,669 | B2 * | 10/2012 | Park | G02B 6/3806 385/135 |
| 8,333,134 | B1 * | 12/2012 | Duffy | B25B 13/06 81/121.1 |
| 8,855,458 | B2 * | 10/2014 | Belenkiy | G02B 6/3898 385/137 |
| D723,346 | S * | 3/2015 | Boyd, Jr. | D8/14 |
| 9,027,446 | B1 * | 5/2015 | Simkin | B25B 13/481 81/124.2 |
| D732,911 | S * | 6/2015 | Schiele | D8/14 |
| D747,635 | S * | 1/2016 | Boyd, Jr. | D8/14 |
| 2003/0192173 | A1 * | 10/2003 | Whitehead | B25B 27/10 29/764 |
| 2004/0035260 | A1 * | 2/2004 | Adkison | B25B 13/06 81/124.2 |
| 2004/0101265 | A1 * | 5/2004 | Jong | G02B 6/3807 385/134 |
| 2005/0257369 | A1 * | 11/2005 | Daily | H05K 13/0491 29/832 |
| 2005/0276560 | A1 * | 12/2005 | Reinert | G02B 6/389 385/134 |
| 2006/0173244 | A1 * | 8/2006 | Boulais | A61B 1/00085 600/156 |
| 2006/0269209 | A1 * | 11/2006 | Mullaney | G02B 6/4475 385/135 |
| 2007/0011857 | A1 * | 1/2007 | Francis | H01R 43/26 29/426.5 |
| 2008/0172800 | A1 * | 7/2008 | Levy | B25B 27/00 7/107 |
| 2009/0188106 | A1 * | 7/2009 | Wang | G02B 6/3897 29/764 |
| 2011/0052131 | A1 * | 3/2011 | Park | G02B 6/3806 385/135 |
| 2011/0268403 | A1 * | 11/2011 | Ciechomski | G02B 6/4471 385/134 |
| 2011/0286702 | A1 * | 11/2011 | Nielson | H01R 13/639 385/76 |
| 2011/0308980 | A1 * | 12/2011 | Alfaro | B25G 1/10 206/350 |
| 2013/0045614 | A1 * | 2/2013 | Ishiyama | H01R 43/26 439/157 |
| 2014/0123397 | A1 * | 5/2014 | Powers | B25B 15/00 7/108 |
| 2014/0322933 | A1 * | 10/2014 | Li | H01R 13/5845 439/76.1 |
| 2014/0327735 | A1 * | 11/2014 | Ruchet | G02B 6/385 348/40 |
| 2014/0331464 | A1 * | 11/2014 | Jiang | G02B 6/3893 29/283 |
| 2014/0357106 | A1 * | 12/2014 | Varshavsky | H01R 43/26 439/152 |
| 2015/0030289 | A1 * | 1/2015 | Jiang | G02B 6/3898 385/76 |
| 2015/0155675 | A1 * | 6/2015 | Bryant | H01R 43/26 29/426.5 |

OTHER PUBLICATIONS

Optimark Fiber Optics Skinny Finger Item# OPT SF-1 at: http://www.optimark-fiber.com/storeproduct468.aspx and https://web.archive.org/web/20100127104759/http:/www.optimark-fiber.com/storeproduct468.aspx.*

Optimark Fiber Optics Skinny Finger extracted from www.web.archive.org.*

DURALite® HEXagonal Nordent Handles; https://web.archive.org/web/20111119201628/http://www.nordent.com/art/pdf/surgical/Handles.pdf.*

* cited by examiner

OPTICAL INTERFACE INSERTION AND EXTRACTION TOOL

FIELD OF DISCLOSURE

The present invention relates to an optical interface insertion and extraction tool and particularly to a tool which facilitates the insertion of an optical fiber into an interface and the extraction of optical fibers and small factor pluggable devices from an interface.

BACKGROUND

In the telecommunications and networking field, a steady trend has been to fit more optical fiber ports into the same area of a product, resulting in an increasing density of optical fiber ports in such products. Hence, the optical fibers plugged into these ports are continually arranged in tighter and denser configurations. Such configurations present difficulties for those looking to remove optical fibers from, or insert optical fibers into, ports in the faceplates of telecommunications and networking devices.

Many optical fiber connectors, such as the LC (Lucent Connector) connector, are configured to be engaged or disengaged using the human hand, such as by using the end of the finger or fingernail. In light of the high density of ports described above, the use of the human hand to interact with optical fibers and their connectors has become quite difficult. These difficulties are further compounded by the fact that when the need arises to service an optical port, it is often important not to interfere or even more critically, not to disconnect the optical cables surrounding the port being serviced, in order to avoid the adverse effects of the unintentional or unwanted disturbance of the cables in the surrounding ports.

In the same field, SFP (Small Form Factor Pluggable) modules are also used in telecommunications and networking products. Similarly to the LC connector, an SFP module is designed to be manipulated by the human hand, but such manipulation is hampered by the density of the optical ports on networking and communications devices.

There are a number of tools which have been developed to address the need for accessing optical connectors in telecommunications and networking devices. However, most of these tools are designed similarly to large sets of tweezers and have a movement similar to pliers, in order to mimic a clamping action of the thumb and forefinger. Such a mechanism requires a certain range of motion to be used. Accordingly, due to these spatial and motion requirements of the workspace, the geometry and mechanics of these tools are not compatible with working on devices with dense arrangements of optical ports.

Clearly, there is a need for a tool which can aid in servicing devices with optical ports, such as telecommunications and networking devices, by allowing the user to reach into arrangements of densely packed optical fibers to both unlatch the connector of an optical fiber and remove the optical fiber or to insert an optical fiber and engage the connector, as the tool of the present application allows. Further, there is a need for a tool which can interact with an SFP module to allow for the disengagement and removal of such a module from a densely packed faceplate.

SUMMARY

Exemplary embodiments of the invention are directed to a tool for insertion and extraction of optical fibers that includes an elongated handle, a cradle element at a first end of the elongated handle, the cradle element being generally C-shaped, a hook element at a second end of the elongated handle, the hook element being generally L-shaped and having a long section connected to the elongated handle parallel to a longitudinal axis of the elongated handle and a short section perpendicular to the longitudinal axis of the elongated handle, and a notch being generally U-shaped formed in the second end of the elongated handle, with the open end of the U shape facing the hook element, the notch being generally flush with the short section.

Further exemplary embodiments of the invention are directed to systems and methods for locking a connector of an optic fiber into place in an optical port, these methods include the steps of opening a gap in a cradle element of a tool and then attaching the cradle element onto a section of an optical fiber not covered by a protective boot of a connector, sliding the cradle element of the tool along the optical fiber and onto the protective boot of the connector until the cradle element contacts with a section where the taper of the protective boot is large enough to engage with the cradle element, thereby allowing the connector to be held with the tool, locking the connector of the optical fiber in place in an optical port by pushing the connector into the port with the tool until the connector latches in place then disengaging the tool from the optical fiber.

The above as well as additional objectives, features, and advantages of the present invention are detailed in the description below, as well as in the drawings.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The tool disclosed is generally configured to facilitate the remote insertion and removal of an optical cable into an optical port of a device, such as a networking or telecommunications device. Various embodiments allow for the remote disengagement and removal of an SFP module from a device, such as a networking or telecommunications device.

Figure 1:
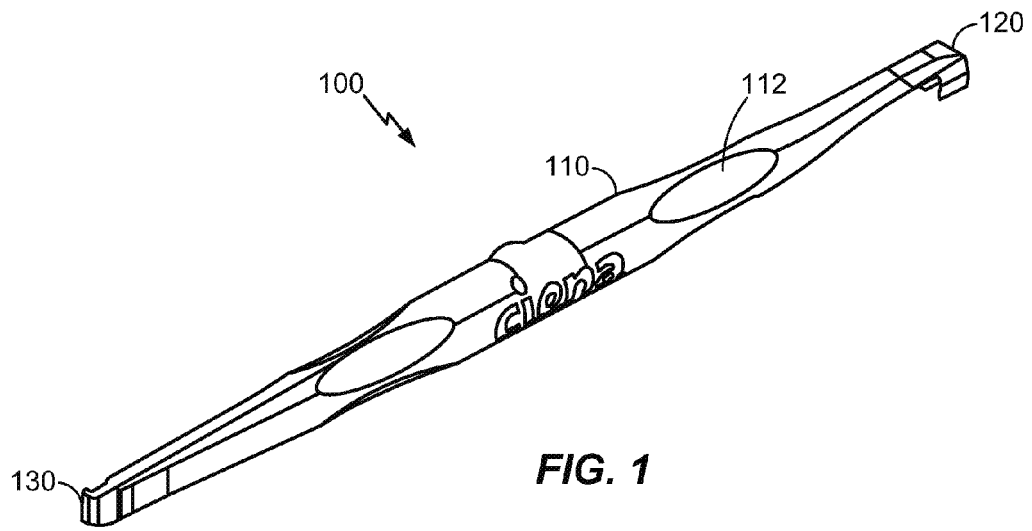
FIG. 1 is a perspective view of an optical interface insertion and extraction tool in accordance with at least one embodiment of the invention.
Figure 2:
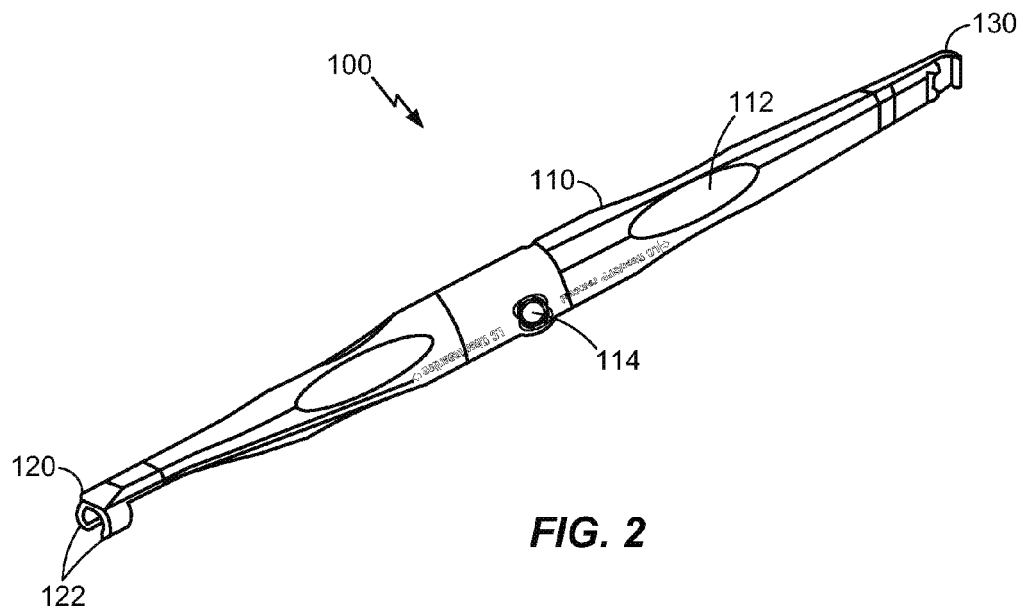
FIG. 2 is another perspective view of an optical interface insertion and extraction tool in accordance with at least one embodiment of the invention.
Figure 3:
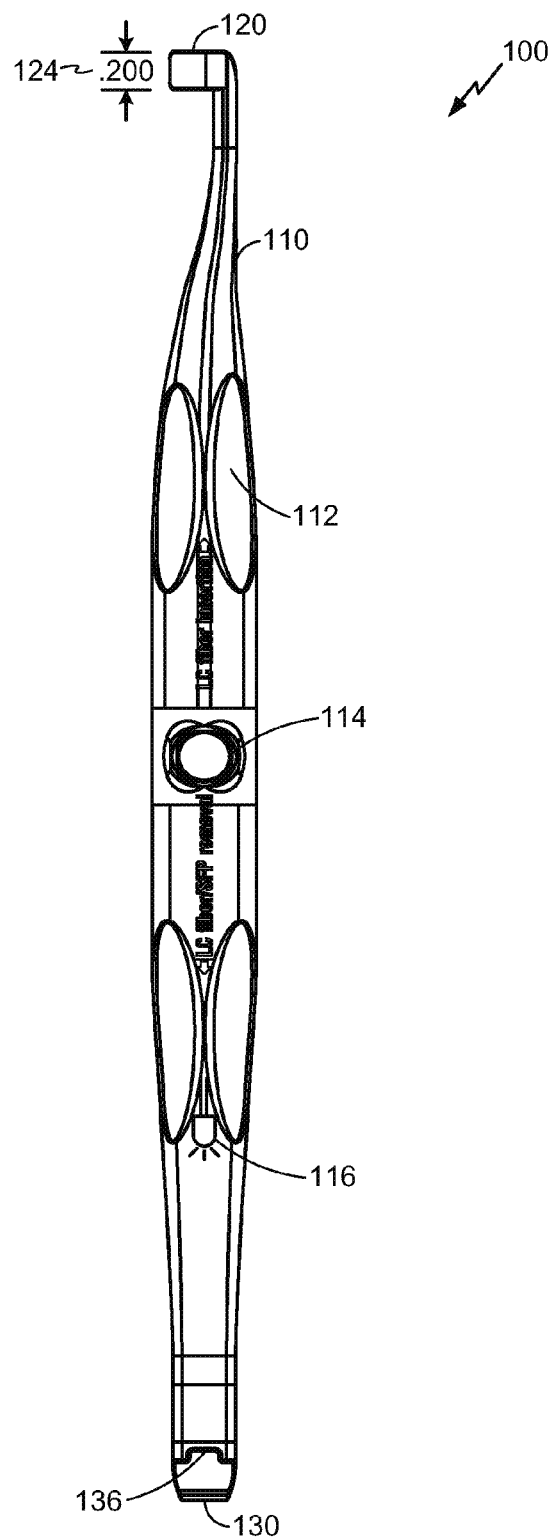
FIG. 3 is a side view of an optical interface insertion and extraction tool in accordance with at least one embodiment of the invention.
Figure 4:
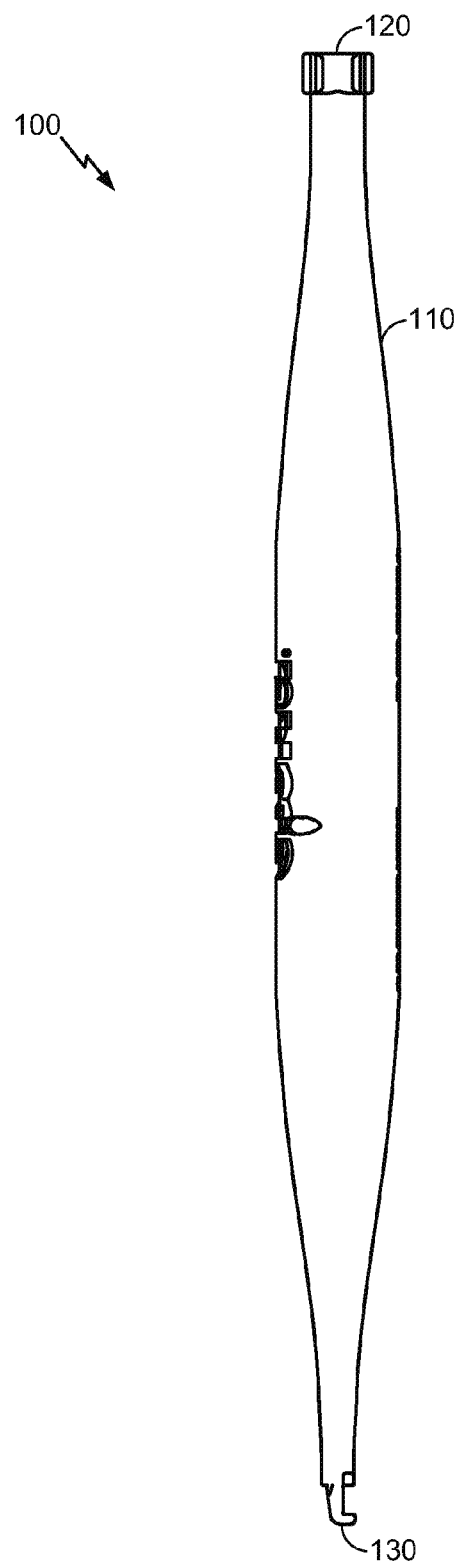
FIG. 4 is a front view of an optical interface insertion and extraction tool in accordance with at least one embodiment of the invention.

FIG. 1 and FIG. 2 illustrate perspective views of the optical interface insertion and extraction tool of the present invention. FIG. 3 and FIG. 4 illustrate a side view and a front view, respectively, of the optical interface insertion and extraction tool. With reference to these drawings, the tool 100 includes an elongated handle 110, which is configured to be held in the hand of the user. The dimensions of the elongated handle 110 can be set as would be appropriate for the purpose of the tool. For example, a length of the elongated handle 110 can be 7.5 inches and a thickness of the elongated handle 110 can be 0.50 inches at the widest portion. However, it will be appreciated that the dimensions provide are not intended to limit the scope of the various embodiments, but instead are merely for illustrative purposes and to provide a relative perspective to the various aspects of the tool 100.

At a first end of the elongated handle 110 is a cradle element 120. The cradle element 120 is generally C-shaped, matching the cross sectional profile of an LC connector's strain relief rubber boot. This cradle element 120 is engageable with a connector's tapered fiber boot on an optical fiber. Particularly, the cradle element 120 can wrap around the connector's fiber and engage with the tapered boot of a standard LC connector or similarly configured connector of an optical fiber. The engagement of the cradle element 120 with the connector allows the optical fiber to be firmly held in the cradle element 120 of the tool 100 via the tapered fiber boot of the connector. Accordingly, the connector can then be remotely inserted into an optical port of a device, such as a networking or telecommunications device. Since the tool 100 allows the optical fiber to be firmly held in place and also allows for precision in the remote engagement of the connector in an optical port without interference of a user's hand, an optical fiber can be remotely placed, even in the faceplate of a device which is densely packed with optical fibers. The connector can be inserted via the tool 100 into the optical port until the latch of the connector is engaged and locked in place. After the engagement of the connector, the tool 100 can be retracted, leaving behind the installed optical fiber.

The dimensions and arrangement of the cradle element 120 are configured so as to provide a firm grip and sufficient support of the engaged connector and the optical fiber, while being thin enough and small enough to fit in between the optical ports of a densely packed faceplate of a device. For example, the cradle element 120 can be configured as discussed below. A diameter of the C shape of the cradle element 120 can be about 0.180 inches. A length of a gap in the C shape can be about 0.12 inches, the C shape can be about 0.280 inches wide, and the thickness of the prongs 122 of the C shape can be about 0.050 inches. A width 124 of the prongs of the C shape can be about 0.200 inches. Further, the cradle element 120 can be arranged so that the C shape is open when viewed from a longitudinal end of the tool 100.

Figure 5:
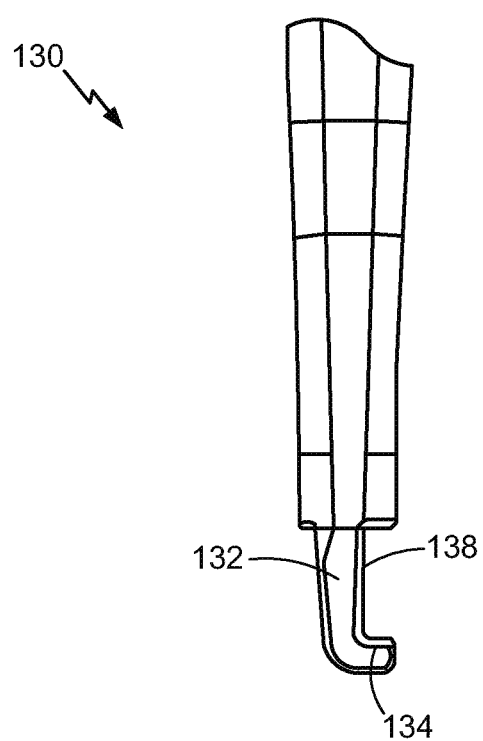
FIG. 5 is a close-up side view of a hook element of an optical interface insertion and extraction tool in accordance with at least one embodiment of the invention.

As can be seen in FIGS. 1-4, at a second end of the elongated handle 110 is a hook element 130. The hook element 130 is generally L-shaped and includes two sections. FIG. 5 illustrates a close-up depiction of the two sections of the hook element. A long section 132 of the hook element 130 is connected to the elongated handle 110 and is generally parallel to the longitudinal axis of the elongated handle 110. The short section 134 of the hook element 130 is connected to the long section 132 and is generally perpendicular to the longitudinal axis of the elongated handle 110. A recess 138 of the hook element 130 can also be present between the short section 134 and the second end of the elongated handle 110. Additionally, the orientations of the hook element 130 and the cradle element 120 can be configured so that they are oriented in the same direction, or they can be oriented at different angles for various reasons, such as for ease of molding.

As illustrated in FIG. 3, the tool 100 further includes a notch 136 being generally U-shaped formed in the second end of the elongated handle 110. The open end of the U shape faces the hook element 130, and the notch 136 is generally flush with the short section 134. This configuration of elements at the second end of the elongated handle 110, allows for multiple uses.

The hook element 130 of the tool 100 is configured to allow for the remote disengagement of an optical fiber connector. Further, the hook element 130 is configured to facilitate the subsequent removal of the optical fiber from a device. For example, the hook element 130 allows for the remote disengagement by remotely pressing a latch that retains a connector (e.g., an LC connector). Accordingly, in some embodiments, the hook element 130 can then engage with an anti-snag clip 310 on a protective boot on the optical fiber. The optical fiber, which has been engaged with the hook element 130, can subsequently be removed from the faceplate of a device. The configuration of the hook element 130 allows for this remote disengagement of the connector from the port, and removal of the optical fiber and connector assembly from the faceplate of a device, without inadvertently disconnecting or interrupting the use of any other optical fibers connected to the device.

Additionally, the hook element 130 and the notch 136 can be configured to allow for the remote disengagement and removal of an SFP module from a device. For example, the hook element 130 allows for the engagement of the tool 100 with a latching bale on a standard SFP module. The latching bale can then be remotely manipulated to disengage the SFP module from a faceplate receptacle, and then the disengaged SFP module can be pulled from a receptacle cage and removed. The configuration of the hook element 130 and notch 136 allows for disengagement and removal of an SFP module with minimal clearance being required. In particular, the notch 136 allows for the hook element 130 to clear the hinge of certain configurations of SFP cages, since the hinge of the SFP cage can nest in the notch 136 when removing an SFP module. Thus, the configuration of the tool 100 allows for the disengagement and removal of an SFP module even in a device with a very dense arrangement of SFP modules and optical fibers. Further, this configuration allows for the removal of SFP modules with many design differences, which are produced by many different manufacturers.

The latches on the optical fiber connectors and the latches of the SFP bales that the tool 100 can interact with have been primarily designed to be manipulated using a human hand, mainly the finger or fingernail. Thus, the tool 100 in some aspects approximates the interaction of a human finger or fingernail with an optical fiber connector or an SFP bale. Accordingly, the tool 100 allows for a high level of precision at least consistent with the use of a finger or fingernail, while allowing a user to reach further into a densely packed area of a device than a human hand would allow while reducing interference with other connectors, optical fibers or other elements in the connection area.

The configuration of the hook element 130, including the dimensions of the element, aid the tool 100 in performing the functions described above, where the tool 100 must be small enough and precise enough to fit into a densely packed area, while being strong enough to interact with the latches and to retract an optical fiber or an SFP module. For example, the hook element 130 can be configured as discussed below. The thickness of the short section 134 of the hook element can be about 0.03 to 0.06 inches, and more particularly the thickness can be about 0.050 inches. This thickness makes the short section 134 as thin as possible to aid in manipulating the hook element in densely packed areas, while still being thick enough to prevent the material of the short section 134 from breaking or sheering off. The length of the short section 134 can be about 0.08 to 0.12 inches, and more particularly, the length of the short section 134 can be about 0.101 inches. This length allows the short section 134 to fit between rows of SFP cages, while remaining short enough to be easily maneuvered in densely packed areas. The length of the recess 138 of the hook element, which is located between the short section 134 and the second end of the elongated handle 110, can be about 0.14 inches to 0.20 inches, and more particularly, the length of the recess 138 can be about 0.150 inches. This length prevents the hook element 130 from passing too deep and accidentally binding to any structures beyond the cage of the SFP module. This configuration allows for multiple uses of the hook element 130 and the ability to slip the tool into a densely packed work area with precision, yet the tool retains the strength to engage with and remove an optical fiber connector or an SFP module.

Furthermore, several portions of the hook element 130 can be tapered. For example, at least a portion of the long section 132 can have a width greater than a width of the 134 short section. In addition, the long section 132 can have a taper from an end adjacent to the elongated handle 110 to the short section 134. Also, a back portion of an intersection of the short section 134 and the long section 132, opposite from the recess 138, can be tapered. This configuration allows the tool 100 to have greater precision to aid in the usage of the tool 100 in densely packed areas.

Figure 7:
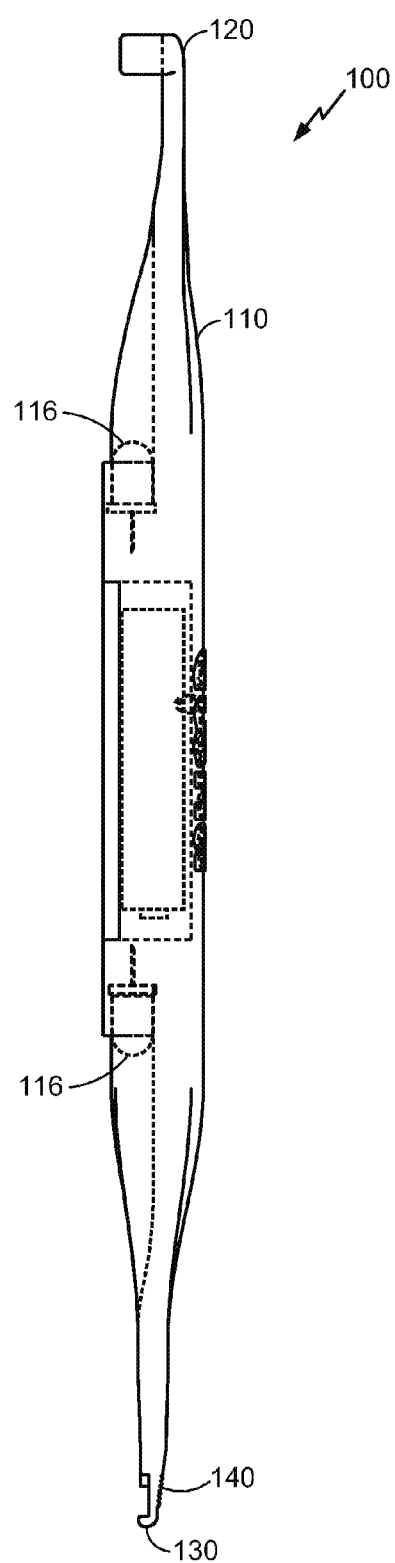
FIG. 7 is a side view of the optical interface insertion and extraction tool in accordance with at least one embodiment of the invention with LEDs facing each distal end, to act as flashlights.

Further, as illustrated in FIG. 7, a plurality of ridges 140 can be present in the hook element 130 on the side opposite from the recess 138. This plurality of ridges 140 provides additional friction between the side of the hook element 130 that is opposite from the recess 138 and a surface being manipulated using the hook element 130 of the tool 100, such as an anti-snag clip 310 of an LC connector 300.

Referring to FIG. 3, additional features can also be included in the tool 100. These features can include attributes that will make the tool 100 more user-friendly. For example, at least one finger recess 112 can be located in the elongated handle 110. More particularly, eight finger recesses 112 can be located in the elongated handle 110, with four finger recesses 112 between a longitudinal midpoint of the elongated handle 110 and the cradle element 120 and four finger recesses 112 between a longitudinal midpoint of the elongated handle 110 and the hook element 130. These finger recesses 112 can aid the user in gripping and orienting the tool 100 and make the tool 100 more comfortable to use.

Further, a magnet 114 can be attached to the elongated handle 110 of the tool 100. More particularly, the magnet 114 can be located in a central portion of the elongated handle 110. The magnet 114 can allow the tool 100 to be conveniently stored on any metal surface, especially a metal surface of the device for which the tool 100 will used. Thus, the magnet 114 allows for both ease of storage and ease of access.

Figure 6:
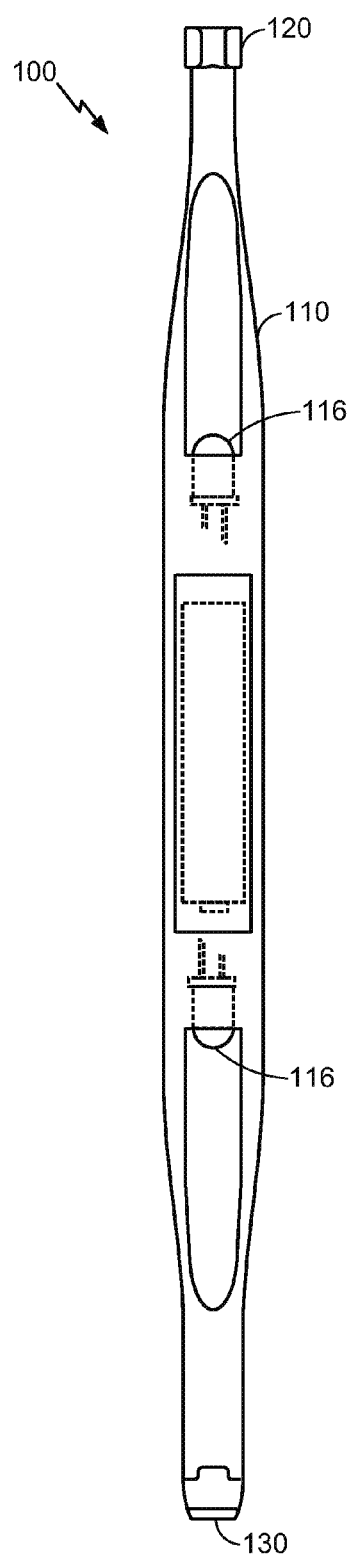
FIG. 6 is a top view of the optical interface insertion and extraction tool in accordance with at least one embodiment of the invention with LEDs facing each distal end, to act as flashlights.

In addition, as illustrated in FIGS. 6 and 7, at least one light source 116 can be attached to the elongated handle 110 of the tool 100. The at least one light source 116 can be controlled by at least one switch built into the elongated handle 110 and can provide illumination of the local work area in which the functions of the tool 100 are being preformed. The material from which the tool 100 is made is not particularly limited. Any suitable material or combinations of material, for example, plastic, fiberglass, carbon fiber, metal, composites, or other material of suitable strength and rigidity can be used to make the tool 100.

Figure 8:
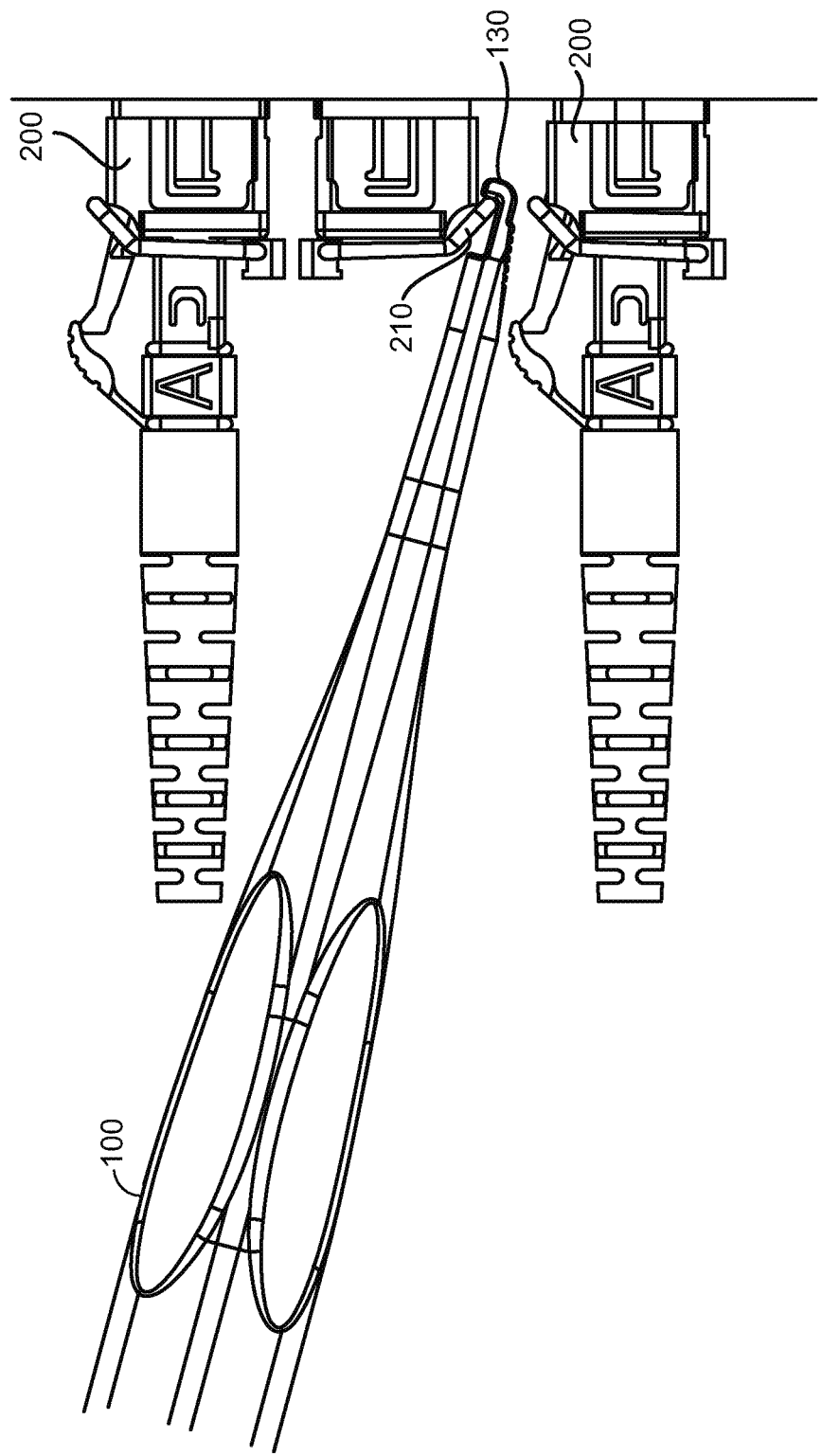
FIG. 8 is a side view of the optical interface and extraction tool in accordance with at least one embodiment of the invention illustrating how the tool is oriented and used to remove an SFP module.

FIG. 8 illustrates how the optical interface insertion and extraction tool 100 can be used to remove an SFP module 200. The hook element 130 allows for the engagement of the tool 100 with a latching bale 210 on a standard SFP module 200. The latching bale 210 can then be remotely manipulated to disengage the SFP module 200 from a faceplate receptacle, and then the disengaged SFP module 200 can be pulled from a receptacle cage and removed. As shown in this figure, the tool 100 allows for disengagement and removal of an SFP module 200 with minimal clearance being required. Thus, even in a device with a very dense arrangement of SFP modules 200 and optical fibers, the tool 100 is able to unlatch the latching bale 210 without disturbing or disconnecting the other SFP modules 200 around the SFP module 200 being removed.

Figure 9:
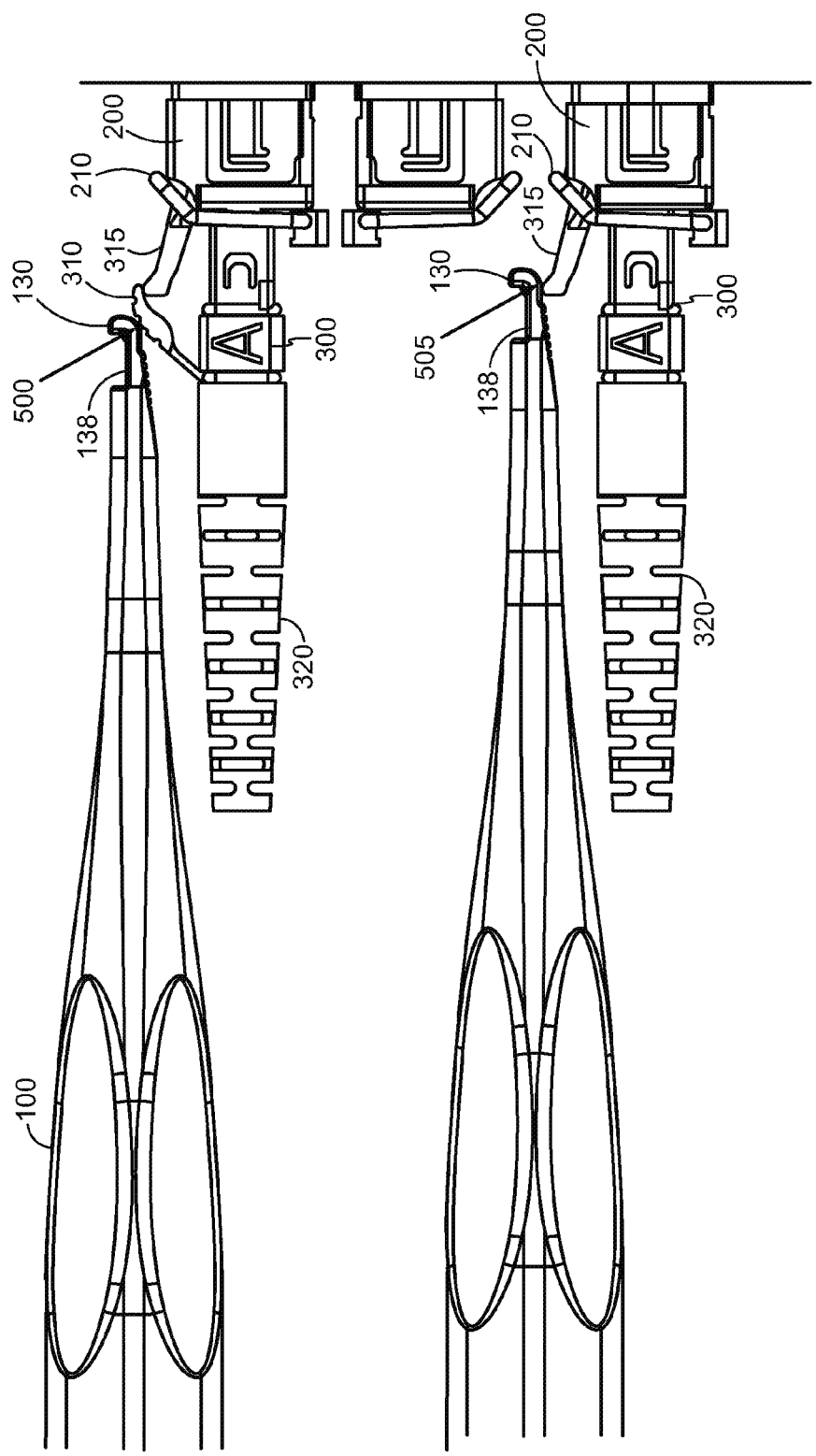
FIG. 9 is a side view of the optical interface insertion and extraction tool in accordance with at least one embodiment of the invention illustrating how the tool may be oriented and used to remove an LC connector from an SFP module.

Referring to FIG. 9, an illustration of how the optical interface insertion and extraction tool 100 may be oriented and used to remove an LC connector 300 from an SFP module 200 is provided. Arrow 500 shows where the side of the hook element 130, that is opposite from the recess 138, can engage with an anti-snag clip 310 of an LC connector 300, allowing for the disengagement of the LC connector 300 from an SFP module 200, and allowing for subsequent removal of the optical fiber. Alternatively, as shown at arrow 505, the side of the hook element 130 that is opposite from the recess 138 can engage with a latch 315 of an SFP module 200, allowing for the disengagement of the LC connector 300 from an SFP module 200, and allowing for subsequent removal of the optical fiber.

Figure 10:
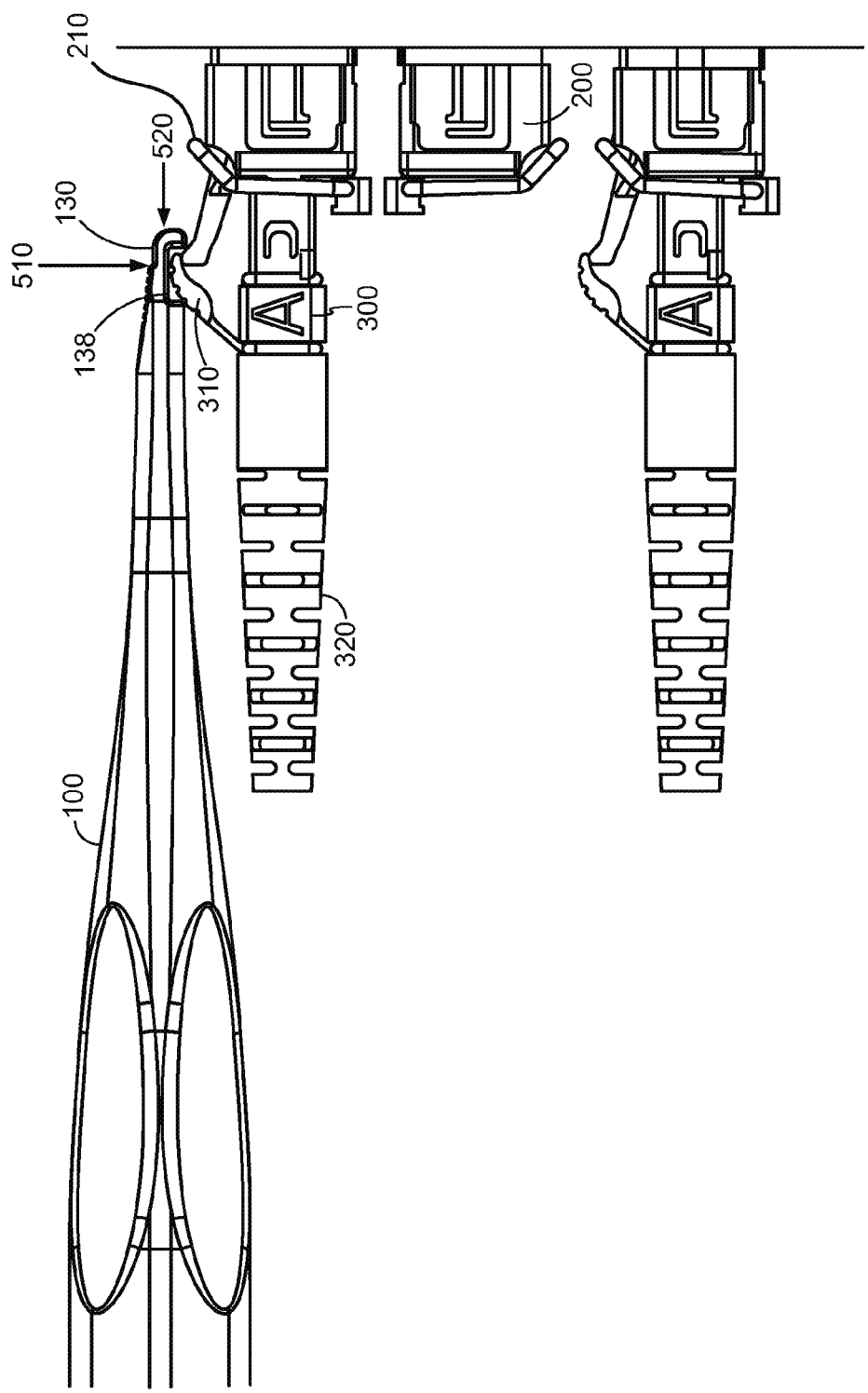
FIG. 10 is a side view of the optical interface insertion and extraction tool shown in accordance with at least one embodiment of the invention illustrating an alternate arrangement for the removal of an LC connector from an SFP module.

Referring to FIG. 10, an alternate arrangement for the removal of an LC connector 300 from an SFP module 200 using the optical interface insertion and extraction tool 100 is illustrated. In this arrangement, the anti-snag clip 310 of the LC connector 300 is engaged in the recess 138 of the hook element 130 by pushing the tool 100 down in the direction of arrow 510. The tool 100 is then pulled in the direction of arrow 520, allowing for the disengagement of the LC connector 300 from an SFP module 200 and allowing for subsequent removal of the optical fiber.

Figure 11:
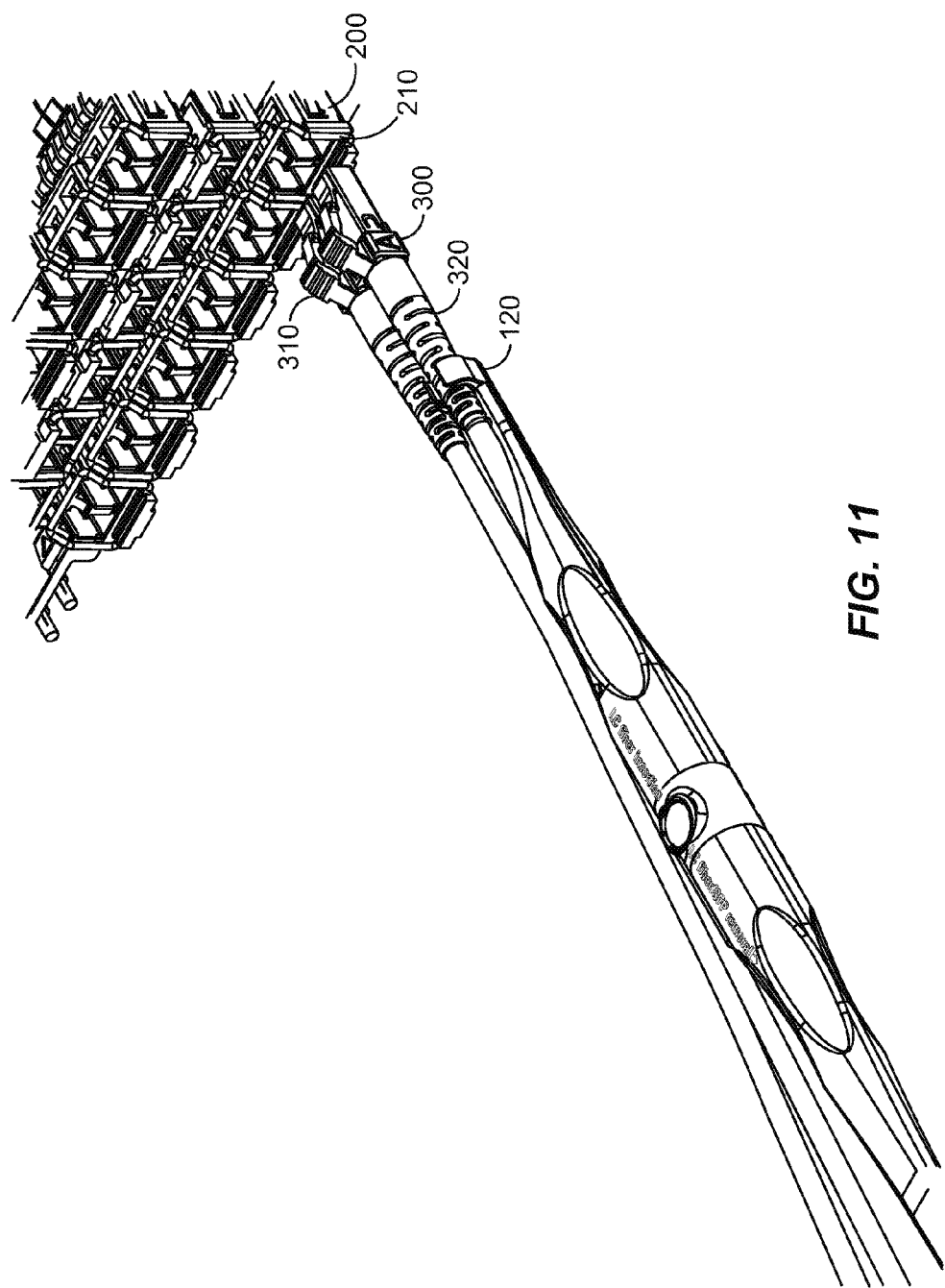
FIG. 11 is an isometric view of the optical interface insertion and extraction tool in accordance with at least one embodiment of the invention illustrating how the cradle element can be used to insert an LC connector into an SFP module.
Figure 12:
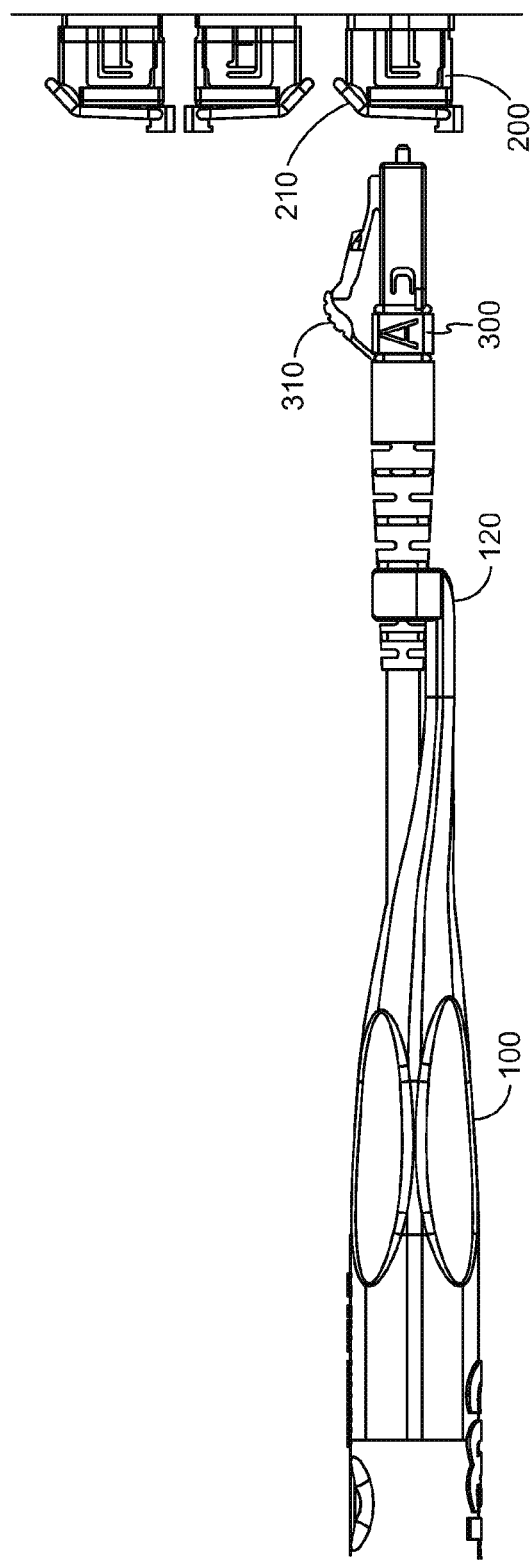
FIG. 12 is a side view of the optical interface insertion and extraction tool in accordance with at least one embodiment of the invention illustrating how the cradle element can be used to insert an LC connector into an SFP module.

Referring to FIG. 11 and FIG. 12, each represent an isometric and a side view of how the cradle element 120 of the optical interface insertion and extraction tool 100 can be used to insert an LC connector 300 into and SFP module 200. The cradle element 120 is engageable with a connector's tapered fiber boot 320 of an optical fiber. Particularly, the cradle element 120 can wrap around the connector's fiber and engage with the tapered fiber boot 320 of a standard LC connector 300 or similarly configured connector of an optical fiber. The engagement of the cradle element 120 with the LC connector 300 allows the optical fiber to be firmly held in the cradle element 120 of the tool 100 via the tapered fiber boot 320 of the LC connector 300.

The tool 100 in various embodiments provides for a configuration whereby one tool allows for both the remote insertion and removal of an optical fiber connector, including any standard LC connector, to or from an optical port of a device. Further, the configuration of the same tool further allows for the disengagement and removal of an SFP module. Accordingly, the tool 100 in various embodiments not only provides multiple useful functions, but the tool is uniquely designed to provide a high level of precision when accessing optical fibers or SFP modules that are arranged in a very dense configuration, as found in modern telecommunications and networking devices.

While the foregoing disclosure describes illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A tool for insertion and extraction of optical fibers comprising:
   an elongated handle with a widened center portion and a narrowed end portion relative to the widened center portion at each of a first end and a second end;
   a cradle element at the first end of the elongated handle, the cradle element being generally C-shaped;
   a hook element at the second end of the elongated handle, the hook element being generally L-shaped and having a long section connected to the elongated handle parallel to a longitudinal axis of the elongated handle and a short section perpendicular to the longitudinal axis of the elongated handle;
   a notch being generally U-shaped formed in the second end of the elongated handle, with an open end of the U shape facing the hook element, the notch being generally flush with the short section;
   a recess of the hook element between the short section and the second end of the elongated handle; and
   a plurality of ridges along a portion of the hook element opposite from the recess.

2. The tool of claim 1, wherein an orientation of the cradle element and an orientation of the hook element are generally the same or differ by approximately 90 degrees.

3. The tool of claim 1, wherein at least one finger recess is present in the elongated handle.

4. The tool of claim 3, wherein eight finger recesses are present in the elongated handle, with four finger recesses between a longitudinal midpoint of the elongated handle and the cradle element and four finger recesses between a longitudinal midpoint of the elongated handle and the hook element.

5. The tool of claim 1, wherein a magnet is attached to the elongated handle.

6. The tool of claim 5, wherein the magnet is located in a central portion of the elongated handle.

7. The tool of claim 1, wherein at least one light is integrated into the elongated handle.

8. The tool of claim 1, wherein the short section of the hook element has a length of about 0.8 to 0.12 inches, a width of about 0.2 to 0.3 inches and a thickness of about 0.3 to 0.6 inches.

9. The tool of claim 1, wherein the recess of the hook element between the short section and the second end of the elongated handle has a length of about 0.14 to 0.20 inches.

10. The tool of claim 1, wherein at least a portion of the long section has a width greater than a width of the short section.

11. The tool of claim 10, wherein the long section has a taper from an end adjacent to the elongated handle to the short section.

12. The tool of claim 9, wherein a back portion of an intersection of the short and long sections opposite from the recess is tapered.

13. The tool of claim 1, wherein the plurality of ridges are configured to provide additional friction between the tool and a surface being manipulated.

14. The tool of claim 13, wherein the surface being manipulated is an anti-snag clip of a connector.

15. The tool of claim 1, wherein the C shape of the cradle element is open when viewed from a longitudinal end, a diameter of the C shape is about 0.180 inches and a length of a gap in the C shape is about 0.12 inches.

* * * * *